United States Patent
Walsh

(10) Patent No.: US 7,029,226 B2
(45) Date of Patent: Apr. 18, 2006

(54) CARGO CARRYING DECK FOR THE TRACTOR OF A SEMITRAILER TRUCK

(76) Inventor: Alan J. Walsh, 9606 Belford Ave., Apt. 3, Los Angeles, CA (US) 90045

( * ) Notice: Subject to any disclaimer, the term of this patent is extended or adjusted under 35 U.S.C. 154(b) by 596 days.

(21) Appl. No.: 09/951,310

(22) Filed: Sep. 10, 2001

(65) Prior Publication Data

US 2002/0011716 A1    Jan. 31, 2002

Related U.S. Application Data

(63) Continuation-in-part of application No. 09/327,273, filed on Jun. 7, 1999, now Pat. No. 6,257,639, and a continuation-in-part of application No. 09/752,290, filed on Jan. 2, 2001.

(51) Int. Cl.
*B60P 1/00* (2006.01)

(52) U.S. Cl. ........... 414/812; 414/477

(58) Field of Classification Search ............ 296/26.11, 296/183, 182, 10; 419/469; 414/477, 478, 414/522, 812
See application file for complete search history.

(56) References Cited

U.S. PATENT DOCUMENTS

| | | | | |
|---|---|---|---|---|
| 2,308,648 A | * | 1/1943 | De Vry et al. | 414/728 |
| 2,606,676 A | * | 8/1952 | Dempster | 414/469 |
| 2,701,654 A | * | 2/1955 | Williamsen | 414/545 |
| 2,848,127 A | * | 8/1958 | Grey | 414/789.3 |
| 3,355,043 A | * | 11/1967 | Talbert | 414/469 |
| 3,357,580 A | * | 12/1967 | Schettler et al. | 414/482 |
| 3,441,158 A | * | 4/1969 | Wilson | 414/632 |
| 3,521,780 A | * | 7/1970 | Cook | 414/632 |
| 3,522,894 A | * | 8/1970 | Tornheim | 414/469 |
| 3,622,026 A | * | 11/1971 | Tornheim | 414/486 |
| 3,674,166 A | * | 7/1972 | Dunbar | 414/469 |
| 3,749,267 A | * | 7/1973 | Lindeborg et al. | 414/470 |
| 3,790,013 A | * | 2/1974 | Smith | 414/636 |
| 3,819,075 A | * | 6/1974 | Derain | 414/491 |
| 3,825,137 A | * | 7/1974 | Mackrill et al. | 414/498 |
| 3,848,758 A | * | 11/1974 | Carter | 414/469 |
| 4,030,171 A | * | 6/1977 | Arguin | 280/408 |
| 4,153,270 A | * | 5/1979 | Brockmiller | 280/490.1 |
| 4,325,666 A | * | 4/1982 | Chain et al. | 414/24.5 |
| 4,345,865 A | * | 8/1982 | Jager | 414/788.9 |
| 4,473,333 A | * | 9/1984 | Stuart | 414/493 |
| 4,621,972 A | * | 11/1986 | Grotte | 414/477 |
| 4,626,166 A | * | 12/1986 | Jolly | 414/812 |
| 4,630,700 A | * | 12/1986 | Larsson | 180/89.13 |
| 4,634,335 A | * | 1/1987 | van den Pol | 414/494 |
| 4,753,313 A | * | 6/1988 | Froroth | 180/209 |
| 4,755,097 A | * | 7/1988 | Corompt | 414/499 |

(Continued)

*Primary Examiner*—Andrew J. Fischer
(74) *Attorney, Agent, or Firm*—Timothy Thut Tyson; Ted Masters; Freilich, Hornbaker & Rosen

(57) ABSTRACT

Cargo carry apparatus (220) for a tractor (500) of a semi-trailer truck includes a rotatable deck (222) mounted between the fifth wheel (502) and the cab which pivots from a vertical position to a horizontal position until the deck rests upon the fifth wheel (502). Deck (222) includes a primary deck (224) and a longitudinally extendable secondary deck (226) which is slidably connected to primary deck (224) and may be pulled out to form an enlarged deck area. A leveler (231) is connected to secondary deck (226) to provide a coplanar surface with primary deck (224) so that a 20 foot cargo container (600) or other large load may be levelly loaded on tractor (500).

3 Claims, 10 Drawing Sheets

U.S. PATENT DOCUMENTS

| | | | |
|---|---|---|---|
| 4,778,327 A * | 10/1988 | Tufenkian et al. | 414/541 |
| 4,790,711 A * | 12/1988 | Calaway | 414/635 |
| 4,825,778 A * | 5/1989 | Riley | 105/393 |
| 4,948,326 A * | 8/1990 | Bedard | 414/541 |
| 4,963,070 A * | 10/1990 | Detrick | 414/492 |
| 5,082,416 A * | 1/1992 | Bock | 414/492 |
| 5,108,247 A * | 4/1992 | Vlaanderen | 414/421 |
| 5,147,170 A * | 9/1992 | Detrick | 414/492 |
| 5,326,212 A * | 7/1994 | Roberts | 414/347 |
| 5,333,981 A * | 8/1994 | Pronovost et al. | 414/24.5 |
| 5,383,714 A * | 1/1995 | Hunter | 298/17 R |
| 5,662,450 A * | 9/1997 | Roberts | 414/347 |
| 5,690,461 A * | 11/1997 | Tilley | 414/111 |
| 6,505,891 B1* | 1/2003 | Hickey et al. | 298/20 A |
| 6,764,274 B1* | 7/2004 | Maclay | 414/812 |
| 6,869,261 B1* | 3/2005 | Burke | 414/11 |

* cited by examiner

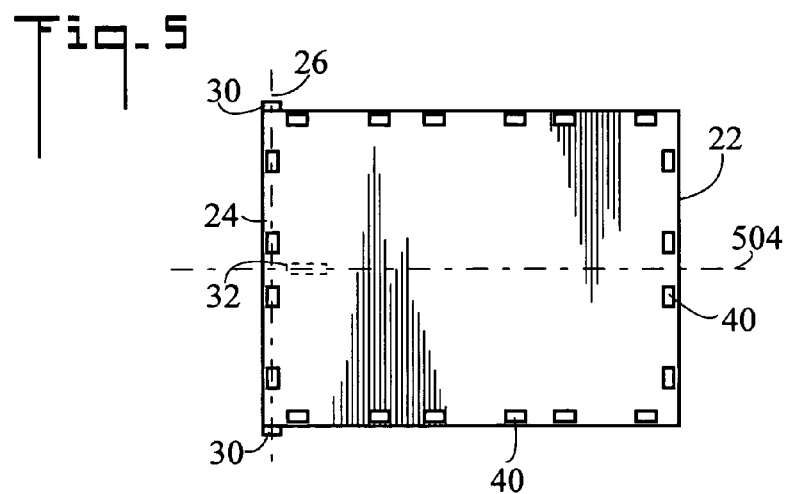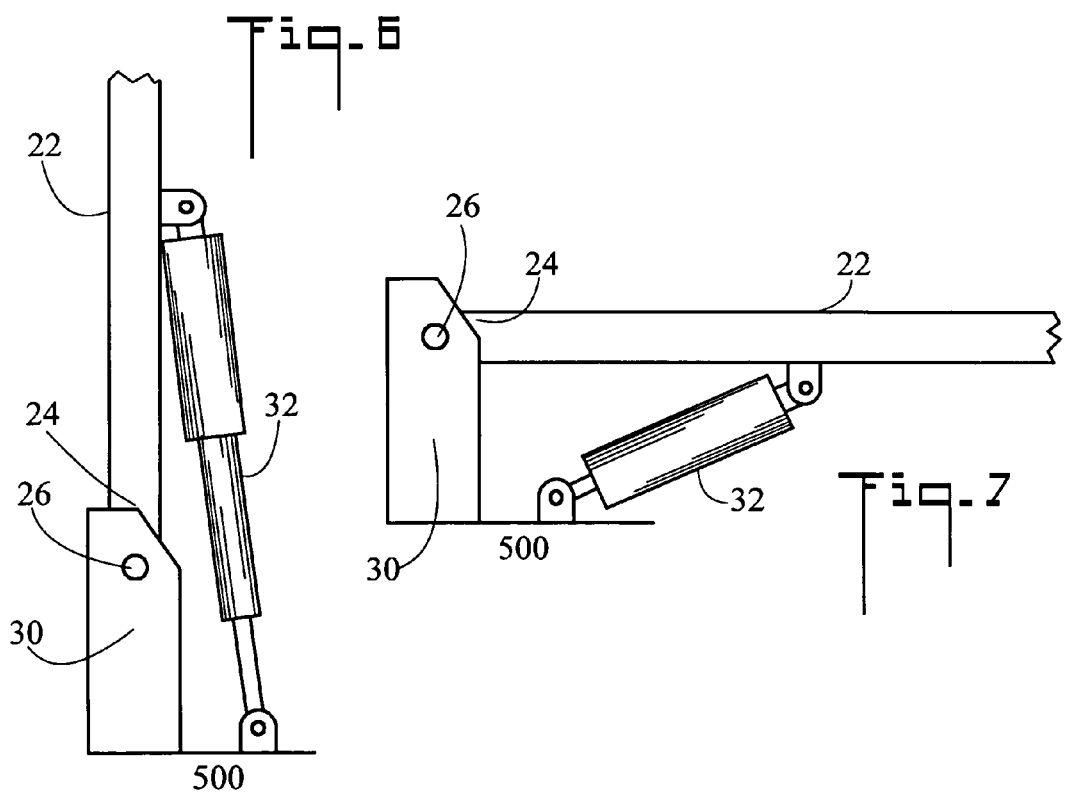

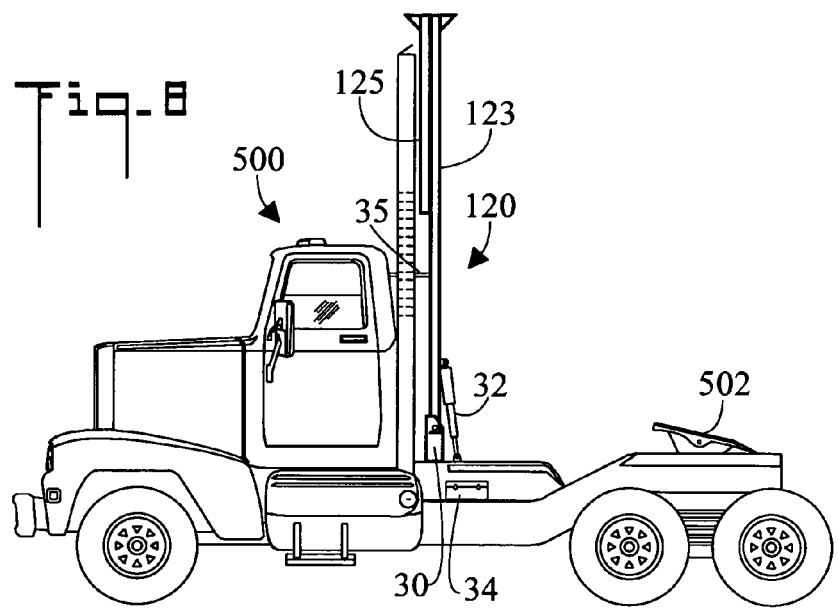
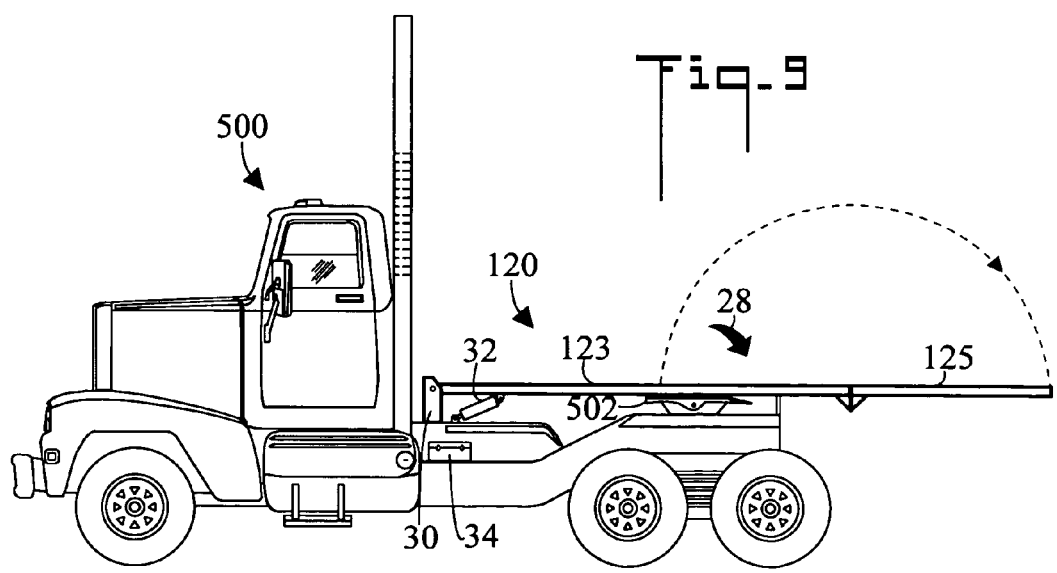

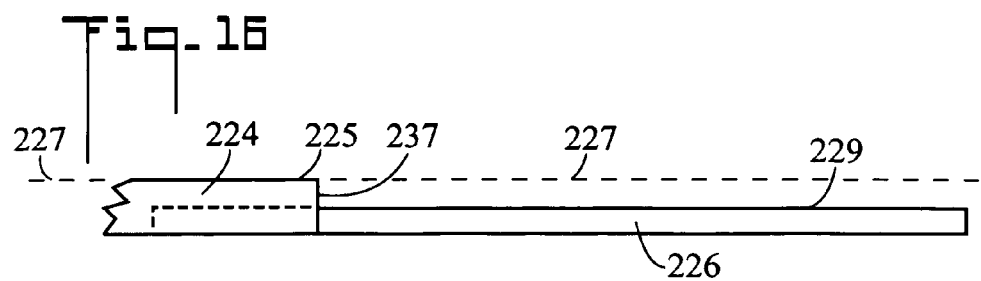
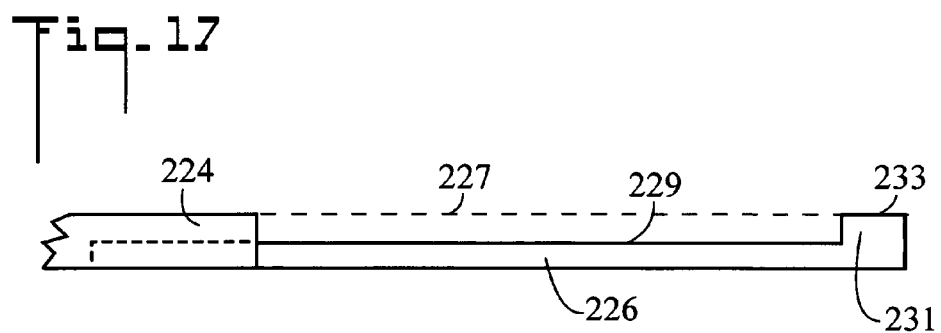
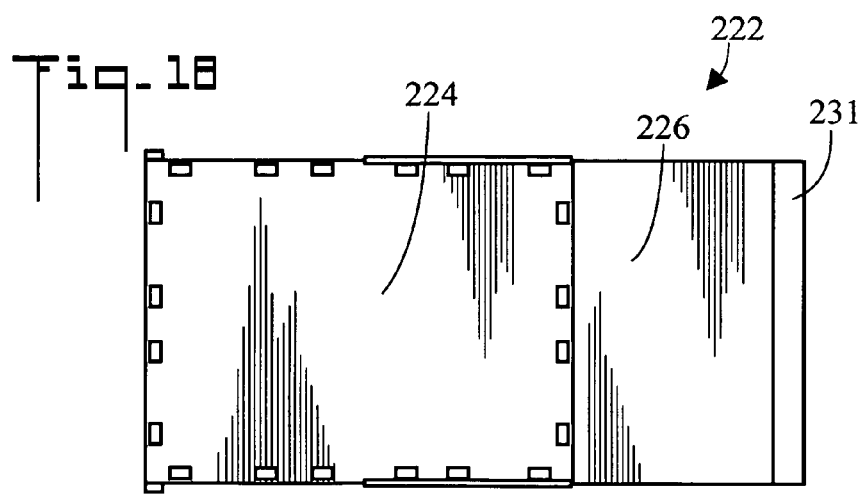

CARGO CARRYING DECK FOR THE TRACTOR OF A SEMITRAILER TRUCK

CROSS REFERENCE TO RELATED APPLICATION

This application is a Continuation In Part of application Ser. No. 09/327,273, filed Jun. 7, 1999, now U.S. Pat. No. 6,257,639, issued Jul. 10, 2001, and application Ser. No. 09/752,290, filed Jan. 2, 2001, which are included herein by reference.

TECHNICAL FIELD

The present invention pertains generally to the field of semitrailer trucks, and in particular to a rotatable deck for the tractor which converts the tractor into a cargo carrying vehicle.

BACKGROUND ART

Semitrailer trucks are utilized throughout the world to transport a variety of goods and materials. Tractors pull the semitrailers in which the goods and materials are loaded. The tractor is typically attached to the semitrailer by means of a fifth wheel on the tractor holding and supporting a kingpin on the semitrailer which permits articulation between the two vehicles.

A semitrailer truck has little difficulty traveling on highways and the wide streets of most cities. However, the narrow roads and streets typically found in residential neighborhoods and remote locations can present problems for the rather large and unmaneuverable semitrailer truck. If the semitrailer truck cannot negotiate a narrow road, the cargo has to be offloaded to a smaller vehicle such as a panel truck to effect delivery to its final destination. This is obviously disadvantageous from a cost standpoint in that two vehicles and two drivers are required to implement the cargo delivery.

The tractor of a semitrailer truck by itself can usually negotiate the narrow roads after the semitrailer is unlocked but the tractor has no cargo carrying capabilities. Tractors have been modified to lift and carry automobiles over their cabs by using hydraulic lifts but these lifts are not for ordinary goods. Hydraulic platforms are commonly added to two axle cargo trucks to lift goods from the street to the beds of the trucks such as seen in U.S. Pat. No. 4,078,676. Similar lift platforms are often seen on semitrailers for the same purpose. However, such lift gates have no use on the tractor of a semitrailer truck because there is no platform on the truck to carry goods after they are lifted.

In view of the above, there exists a need to provide a better way to deliver cargo to a difficult location that is not able to receive a semitrailer truck. It is toward this goal that the inventive concepts of the present invention are directed.

DISCLOSURE OF INVENTION

The present invention is directed to a rotatable deck for the tractor of a semitrailer truck which converts the tractor into a cargo carrying vehicle. The present invention thereby solves the aforementioned problem of requiring the presence of two vehicles and two drivers to deliver cargo to sites located in areas having narrow or otherwise less accessible roads. Instead of off loading the cargo onto a second vehicle, the driver unhooks the semitrailer and drives around to the open doors at the side or back of the semitrailer. The rotatable deck of the tractor is lowered to a horizontal position until the deck rests upon the fifth wheel at substantially the elevation of the bed of the semitrailer. The cargo may then be offloaded onto the deck, and transported using several trips to the final destination by the tractor. By virtue of the present invention, the tractor is transformed into a smaller cargo carrying vehicle which is capable of negotiating narrow roads and streets. The need for a second vehicle and driver is eliminated and the cost of delivery resultantly decreased.

In accordance with a preferred embodiment of the invention, a cargo carrying apparatus for a tractor having a fifth wheel includes a deck which is selectively rotatable from a substantially vertical orientation to a substantially horizontal orientation so that the deck may be positioned above and rest upon the fifth wheel of the tractor. The deck is comprised of a primary deck and a secondary deck which may be slidably extended from the primary deck to form an enlarged deck surface. A leveler is connected to the top portion of the secondary deck, so that the leveler and the primary deck define a flat surface upon which a large piece of cargo such as a 20 foot container can levelly rest.

In accordance with an important aspect of the invention, the leveler includes a lip which upwardly projects from the secondary deck.

In accordance with an important feature of the invention, a second embodiment of the leveler includes at least one member which is removably connectable to the top portion of the secondary deck.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 5 is a top plan view of the deck;

FIG. 6 is an enlarged view of area 6 of FIG. 2;

FIG. 7 is an enlarged view of area 7 of FIG. 4;

FIG. 8 is a side elevation view of a second embodiment of the cargo carrying apparatus with the deck in the upright orientation and having a rotatable extension portion;

FIG. 9 is a side elevation view of the second embodiment in the lowered horizontal orientation;

FIG. 16 is an enlarged view of area 16 of FIG. 14;

FIG. 17 is a view of FIG. 16 with a leveler installed;

FIG. 18 is a top plan view of a primary deck, an extended secondary deck, and a leveler;

MODES FOR CARRYING OUT THE INVENTION

Figure 1:
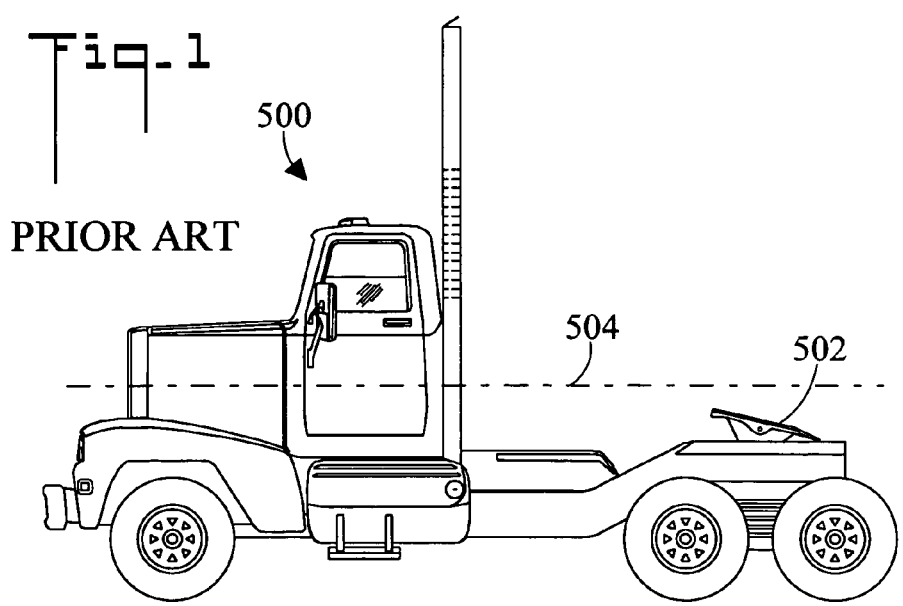
FIG. 1 is a side elevation view of a prior art tractor for a semitrailer truck.

Referring initially to FIG. 1, there is illustrated a side elevation view of a prior art tractor for a semitrailer truck, generally designated as 500. Tractor 500 includes a fifth wheel 502 for connection to a semitrailer and a longitudinal axis 504.

Figure 2:
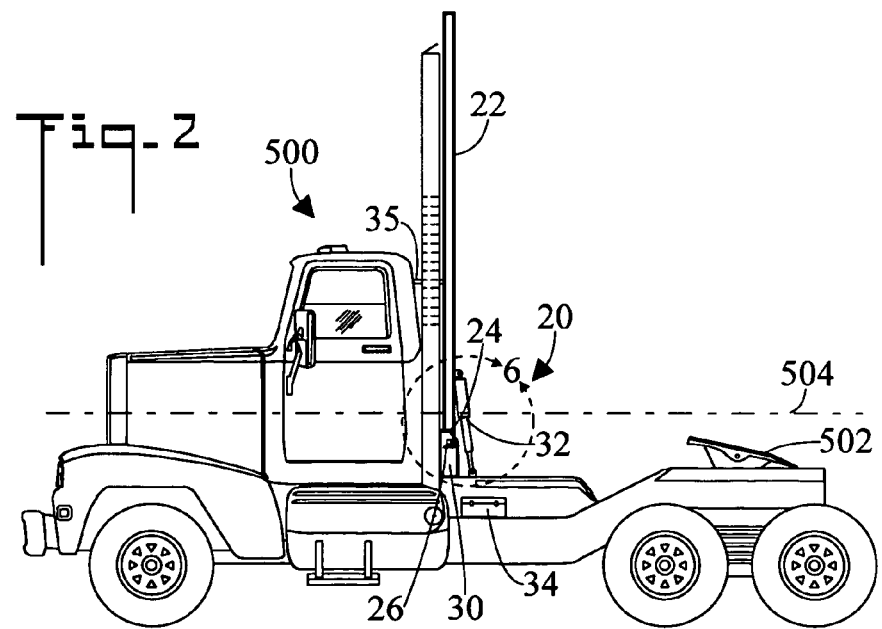
FIG. 2 is a side elevation view of the cargo carrying apparatus of the present invention installed on the tractor, showing the cargo deck in its raised upright orientation.

FIG. 2 shows a side elevation view of the cargo carrying apparatus of the present invention, generally designated 20, installed on the tractor 500. Cargo carrying apparatus 20 includes substantially planar cargo deck 22 having an end portion 24. Deck 22 is shown in its raised upright position. In terms of construction, deck 22 may be of any convenient design such as solid, hollow, or framed. In a preferred embodiment, deck 22 is fabricated from strong lightweight materials so that it may be easily rotated from an upright substantially vertical position to a horizontal position and also to minimize weight which adds to the cost of operating the truck. The end portion 24 is rotatably connected to tractor 500 around a pivot axis 26 which is substantially perpendicular to longitudinal axis 504 (also refer to FIG. 5). Also referring to FIGS. 3 and 4, deck 22 is rotatable in direction 28 from a substantially vertical orientation (FIG. 2) to a substantially horizontal orientation (FIG. 4) with deck 22 disposed above fifth wheel 502. In the preferred embodiment shown in FIG. 4, deck 22 rests upon and is supported by fifth wheel 502. In its substantially vertical upright orientation (FIG. 2), deck 22 is positioned directly behind the cab of tractor 500. It may be appreciated that due to the presence of deck 22, hydraulic, pneumatic, brake lines, and electrical lines used to connect the tractor to the semitrailer might have to be rerouted.

Figure 4:
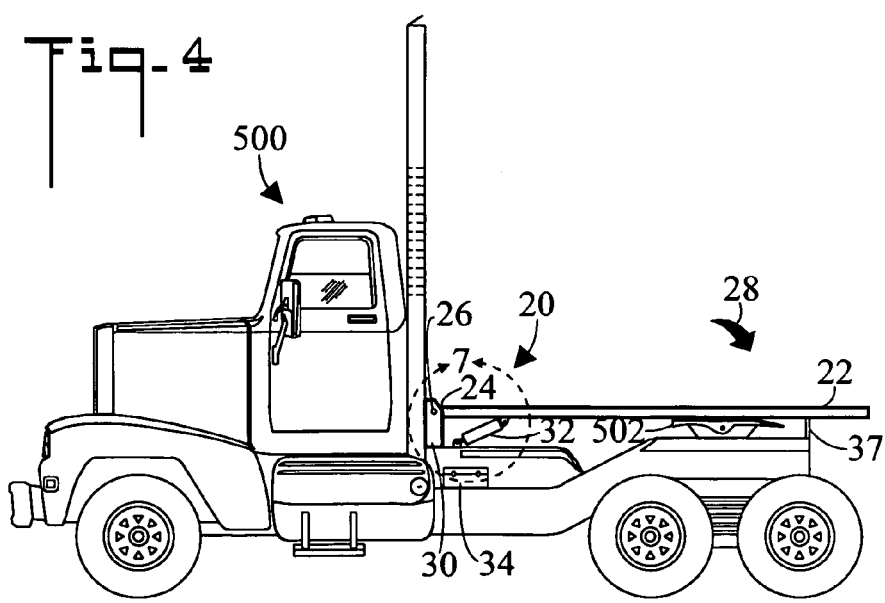
FIG. 4 is a side elevation view of the deck in the lowered horizontal orientation with the deck supported by the fifth wheel.

Deck 22 is rotatably connected to at least two spaced brackets 30 which are connected to the tractor in front of fifth wheel 502 (also refer to FIG. 5). At least one variable length controller 32 is connected between deck 22 and tractor 500. Variable length controller 32 has an extended position and a retracted position. When variable length controller 32 is in its extended position, deck 22 has a substantially upright vertical orientation (FIG. 2). When variable length controller is in its retracted position, deck 22 has a substantially horizontal orientation (FIG. 4). It may be appreciated that other design arrangements could be made wherein the extended position would place deck 22 in a horizontal orientation and the retracted position would place deck 22 in a vertical orientation. In a preferred embodiment, variable length controller 32 is a bidirectional hydraulic cylinder and piston assembly, of which numerous models are well known in the machinery art. Electric motor or pneumatically operated length controllers could also be employed. In a preferred embodiment, the cylinder and piston are operated by 12 volts DC supplied by a battery which is charged by the tractor. The hydraulic controls may be placed at any convenient location, and in a preferred embodiment are placed in a control box 34 mounted on tractor 500. It may be appreciated that other mechanical means such as manually operated jacks, and the like, could also be used to lower and raise deck 22. A first retaining means 35 holds deck 22 in a substantially vertical orientation, and in a preferred embodiment, connects deck 22 to the cab of the tractor 500.

Figure 3:
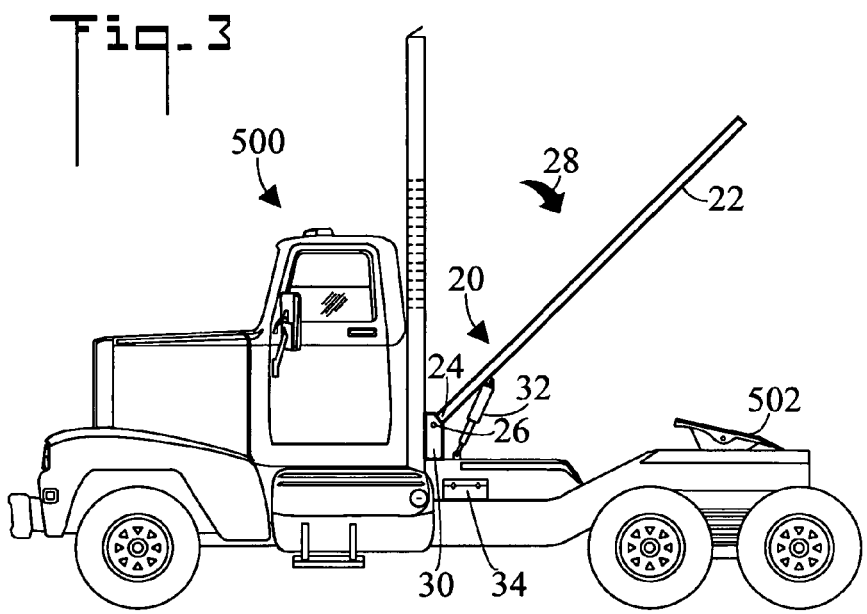
FIG. 3 is a side elevation view of the deck in a partially lowered position.

FIG. 3 is a side elevation view of cargo carrying apparatus 20 with deck 22 in a partially lowered position. FIG. 4 is a side elevation view of deck 22 in the lowered horizontal orientation with the deck 22 abutting and supported by the fifth wheel 502. A second retaining means 37 holds deck 22 to tractor 500 when deck 22 is in the substantially horizontal orientation.

Figure 10:
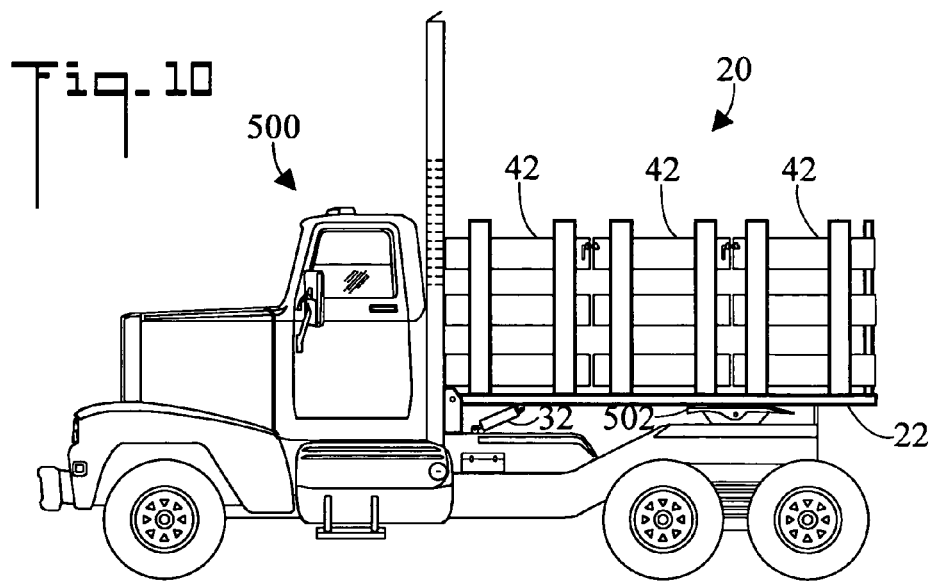
FIG. 10 is a side elevation view of stakes installed on the deck.

FIG. 5 is a top plan view of deck 22. In a preferred embodiment, deck 22 is substantially rectangular and has dimensions of about 9.5 feet long, 8.5 feet wide, and 2 to 4 inches thick. Deck 22 rotates about pivot axis 26. Spaced brackets 30 are attached to tractor 500 and deck 22 is rotatably connected to spaced brackets 30. In a preferred embodiment, deck 22 includes a plurality of stake receiving slots 40 which are adapted to receive a plurality of stakes 42 (FIG. 10). The stakes can be used to enclose the cargo deck 22.

FIG. 6 is an enlarged view of area 6 of FIG. 2 showing variable length controller 32 in the extended position connected between deck 22 and tractor 500. End portion 24 of deck 22 is rotatably connected to spaced brackets 30 and deck 22 rotates about pivot axis 26.

FIG. 7 is an enlarged view of area 7 of FIG. 4 showing variable length controller 32 in the retracted position.

FIG. 8 is a side elevation view of a second embodiment of the cargo carrying apparatus, generally designated as 120, in an upright orientation. FIG. 9 is a side elevation view of the second embodiment in the lowered horizontal orientation. In this embodiment, the deck comprises a main portion 123 and an extension portion 125. Extension portion 125 is rotatably connected to main portion 123. When main portion 123 is in a horizontal orientation and extension portion 125 is lowered, the extension portion coplanarly aligns with main portion 123 thereby forming an elongated deck. In a preferred embodiment, the elongated deck is about 14 feet long and is capable of carrying more cargo than is deck 22.

Figure 11:
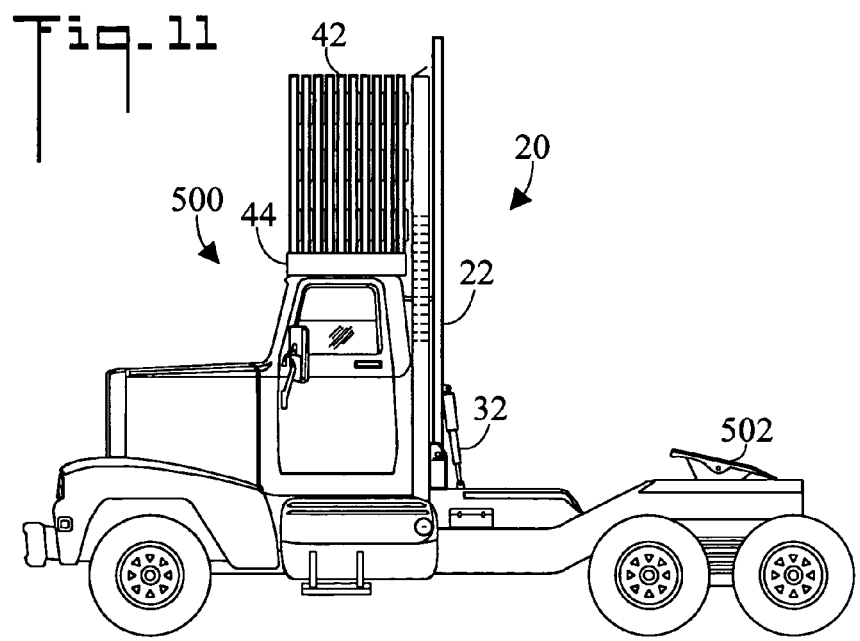
FIG. 11 is a side elevation view of the stakes stored in a rack mounted on the top of the tractor cab.

FIG. 10 is a side elevation view of stakes 42 selectively installed in stake receiving slots 40 of a lowered deck 22 such as shown in FIG. 4, FIG. 11 is a side elevation view of a plurality of stakes 42 selectively stored in a rack 44 connected to the top of the cab of the tractor 500.

When the present invention is installed on a semitrailer truck such as a moving van, the driver loads the semitrailer in the normal manner with furniture and other household goods. He then travels across country or across town with his load. Upon arrival near his destination, he may discover that he cannot unload at the destination because the streets are too narrow. Or he may have been prewarned that he could not unload directly at the destination because of access limitations. Instead of contracting for the services of a smaller truck as would have been necessary in the past, all he has to do is unhook his semitrailer and use his tractor to unload and ferry the goods to the final destination. He activates the variable length controller 32 so that the deck 22 rotates to a substantially horizontal orientation resting on fifth wheel 502 as shown in FIG. 4, opens either the side or rear doors of the semitrailer, and drives his tractor to place the deck 22 adjacent the open doors. If desired, and so equipped, he can then lower some of the stakes 42 from the top of his cab and place them in suitable stake receiving slots in the deck 22 leaving access to the doors on the semitrailer. After transferring some of the cargo from the semitrailer to the deck, he installs additional stakes in the deck across the area of the doors to secure the goods on the deck. He then drives the tractor 500 to the ultimate destination where he unloads it. Five to ten trips with the tractor will typically be sufficient to transfer the contents of a loaded semitrailer to the ultimate destination.

Another use for the tractor equipped with the present invention would be to transfer goods simply for the convenience provided. For example, the driver might park the semitrailer at the front of a house and unload most of the load directly into the front door. He could then use the tractor to transfer some items to the rear of the house by unloading them initially onto the deck 22 and driving to the back of the house with the tractor without having to deal with the large semitrailer.

Figure 12:
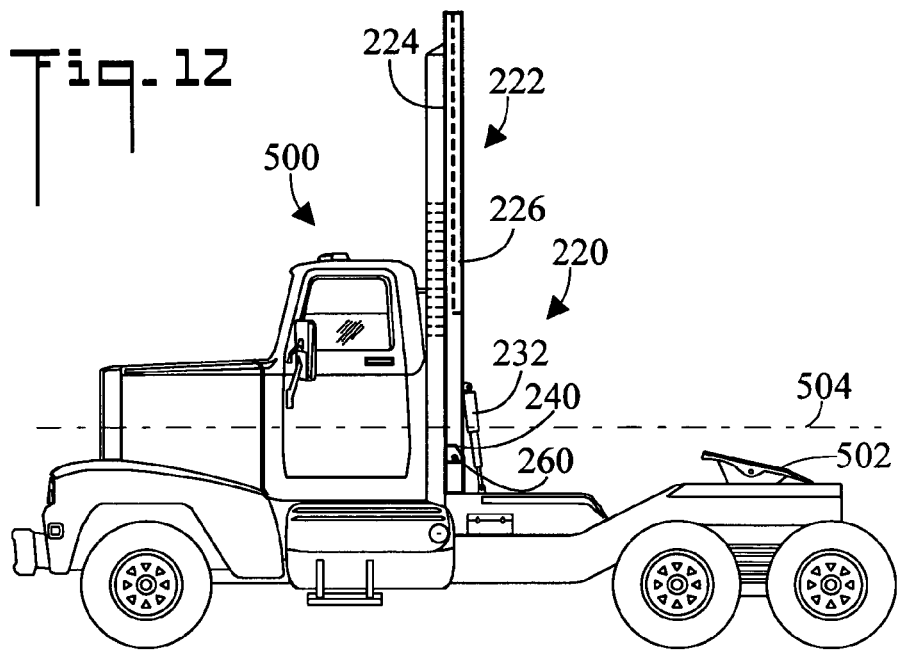
FIG. 12 is a side elevation view of a third embodiment of the cargo carrying apparatus with the deck in the upright orientation.

FIG. 12 is a side elevation view of a third embodiment of the cargo carrying apparatus for a tractor 500 having a fifth wheel 502 with deck 222 in the upright orientation, generally designated as 220. Deck 222 includes a primary deck 224 and a longitudinally extendable secondary deck 226 slidably connected to primary deck 224. Primary deck 224 has an end portion 240 which is rotatably connected to tractor 500, so that primary deck 224 is selectively rotatable from a substantially vertical orientation to a substantially horizontally orientation (refer to FIG. 13) around a pivot axis 260 which is substantially perpendicular to the longitudinal axis 504 of the tractor 500. A variable length controller 232 such as a hydraulic cylinder is used to rotate deck 222. Extendable secondary deck 226 is slidably connected to primary deck 224, so that when primary deck 224 is in a horizontal orientation, extendable secondary deck 226 may be selectively extended from primary deck 224 to form an enlarged deck area (refer to FIGS. 14 and 15).

Figure 13:
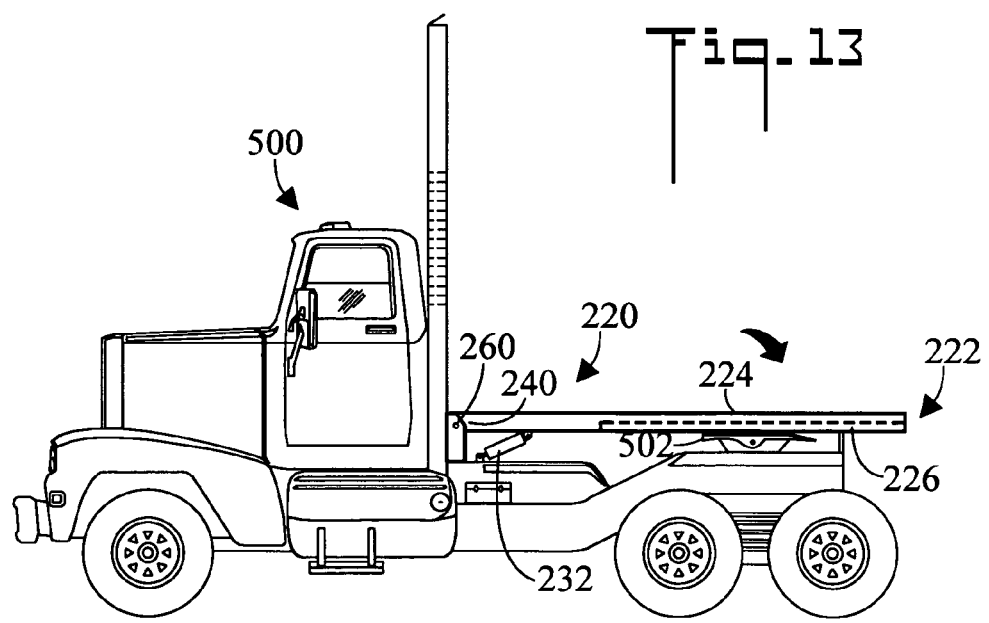
FIG. 13 is a side elevation view of the third embodiment with the deck in the lowered horizontal orientation.

FIG. 13 is a side elevation view of third embodiment 220 with deck 222 in the lowered substantially horizontal orientation with primary deck 224 disposed above fifth wheel 502.

Figure 14:
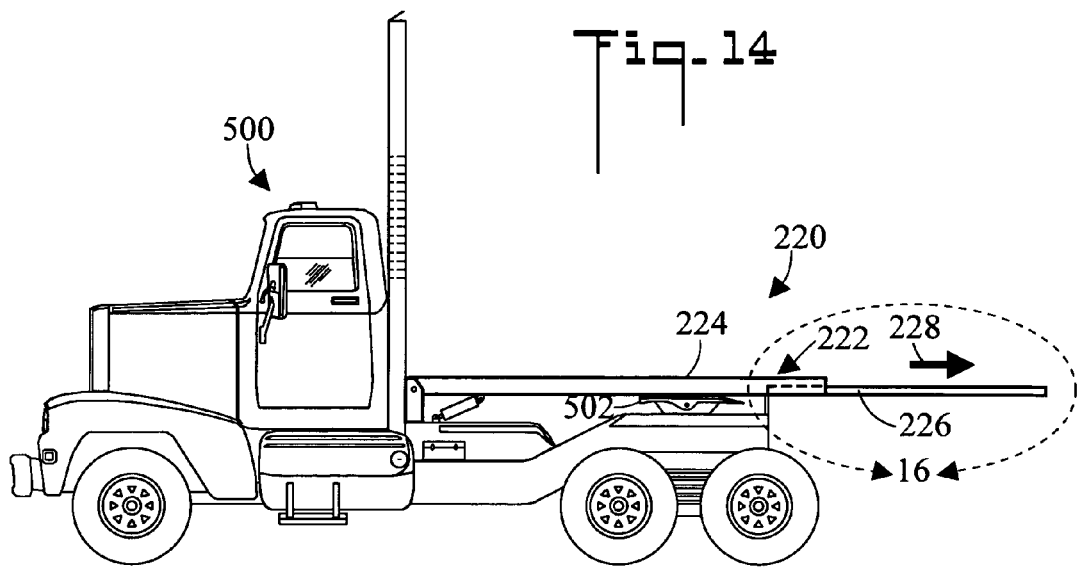
FIG. 14 is a side elevation view of the third embodiment with an extendable portion of the deck extended from a main portion to form an enlarged deck area.

FIG. 14 is a side elevation view of third embodiment 220 with longitudinally extendable secondary deck 226 extended (pulled out) from primary deck 224 in direction 228 along longitudinal axis 504 to form an enlarged deck area.

Figure 15:
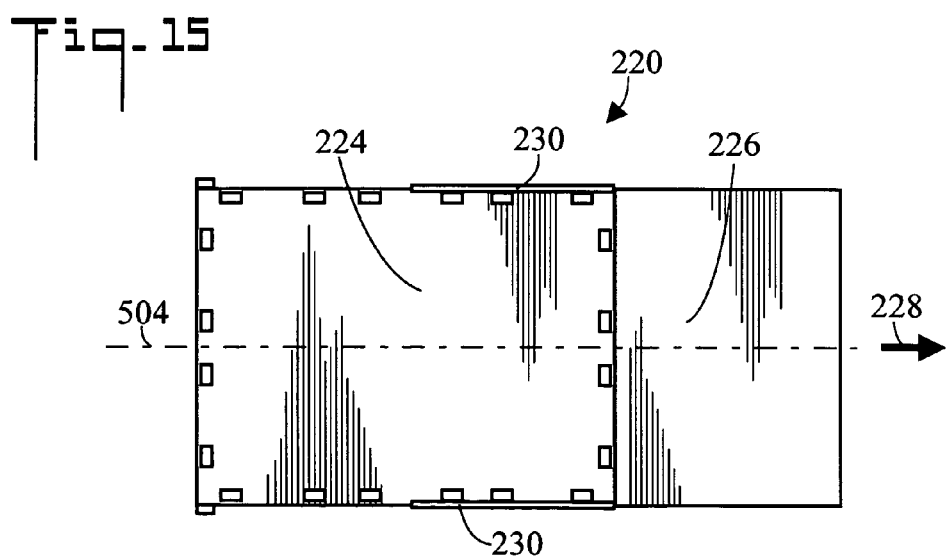
FIG. 15 is a top plan view of the main portion and the extendable deck portion, with the extendable portion in an extended position.

FIG. 15 is a top plan view of primary deck 224 and longitudinally extendable secondary deck 226, with secondary deck 226 in an extended (pulled out) position. In this configuration, primary deck 224 and secondary deck 226 combine to form an enlarged deck area which is capable of carrying additional cargo. The mechanism for extending secondary deck 226 may be implemented in numerous ways well known in the art. In one possible embodiment, two U-shaped edge rails 230 and cooperating rollers captively engage primary deck 224 and secondary deck 226, and permit secondary deck 226 to be slidably extended in direction 228.

FIG. 16 is an enlarged view of area 16 of FIG. 14. Primary deck 224 has a first top portion 225 which defines a plane 227 (shown edgewise). Secondary deck 226 has a second top portion 229. Second top portion 229 is vertically displaced from first top portion 225, thereby presenting a ledge 237 which is objectionable in that it results in an unlevel expanded deck 222.

FIG. 17 is a view of FIG. 16 with a leveler 231 installed. Leveler 231 is connected to top portion 229 of secondary deck 226. Leveler 231 has a third top portion 233. Leveler 231 is shaped and dimensioned so that when secondary deck 226 is in the extended position, third top portion 233 of leveler 231 is substantially coplanar with plane 227 defined by first top portion 225 of primary deck 224 thereby forming an enlarged level deck area (also refer to FIG. 18). In the shown embodiment, leveler 231 includes a lip permanently mounted on the rearmost portion of secondary deck 226 which upwardly projects from secondary deck 226. When the secondary deck 226 is pushed into the primary deck 224, the permanently attached lip leveler 231 will butt against ledge 237 and remain outside.

FIG. 18 is a top plan view of primary deck 224, extended secondary deck 226, and leveler 231 of FIG. 17.

Figure 19:
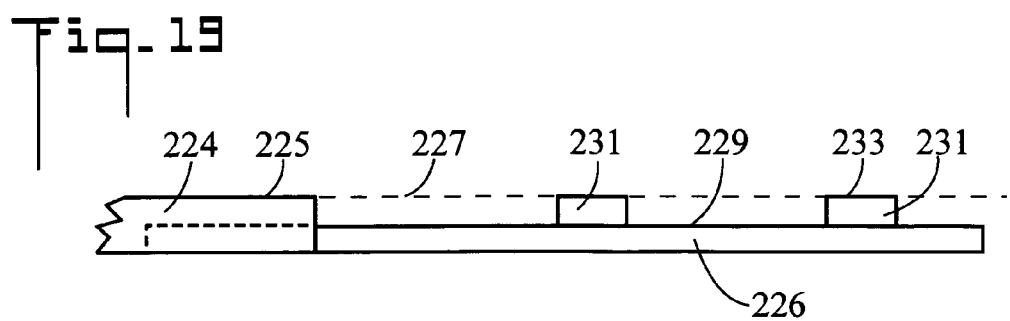
FIG. 19 is a view of FIG. 16 with a second embodiment of a leveler installed.

FIG. 19 is another enlarged view of area 16 of FIG. 14 showing a second embodiment of leveler 231. In this embodiment, leveler 231 includes at least one member which is removably connectable to second top portion 229 of secondary deck 226. In the shown embodiment, leveler 231 comprises a beam-like structure (two in the shown embodiment) which is placed on second top portion 229 of secondary deck 226 to create a surface which is level with first top portion 225 of primary deck 224. Leveler 231 may be temporarily affixed to second top portion 229 of secondary deck 226 in any convenient manner.

Figure 20:
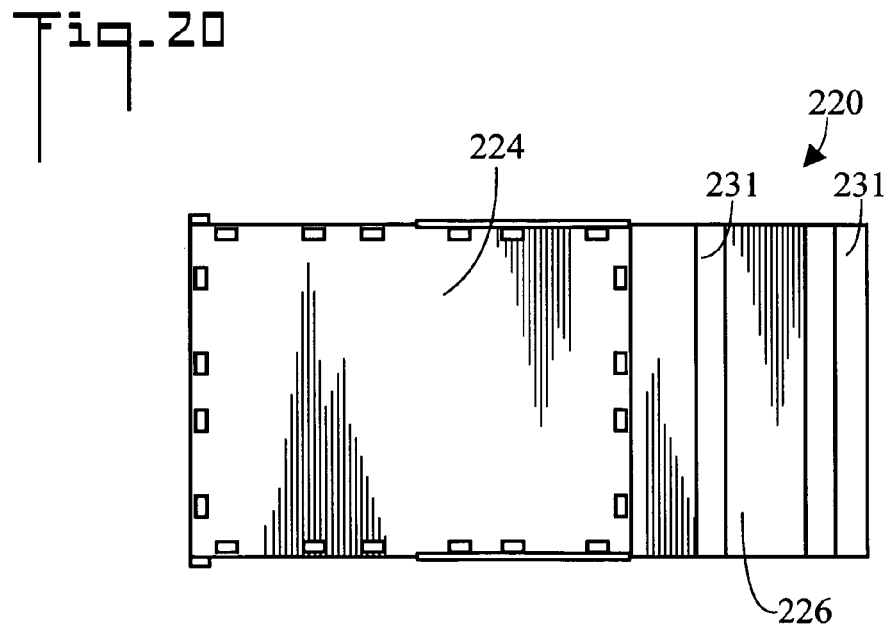
FIG. 20 is a top plan view of a primary deck, an extended secondary deck, and the second embodiment leveler.

FIG. 20 is a top plan view of primary deck 224, extended secondary deck 226, and leveler 231 of FIG. 19. The levelers are preferably made of carbon steel. Wood blocks could also be used but they tend to rot, split, and chip. The levelers could be held in position in grooves, by bolts or clamps, or by any other holding means. Or they could be simply laid on top of second top portion 229. When not in use, the levelers may be stored behind the cab.

Figure 21:
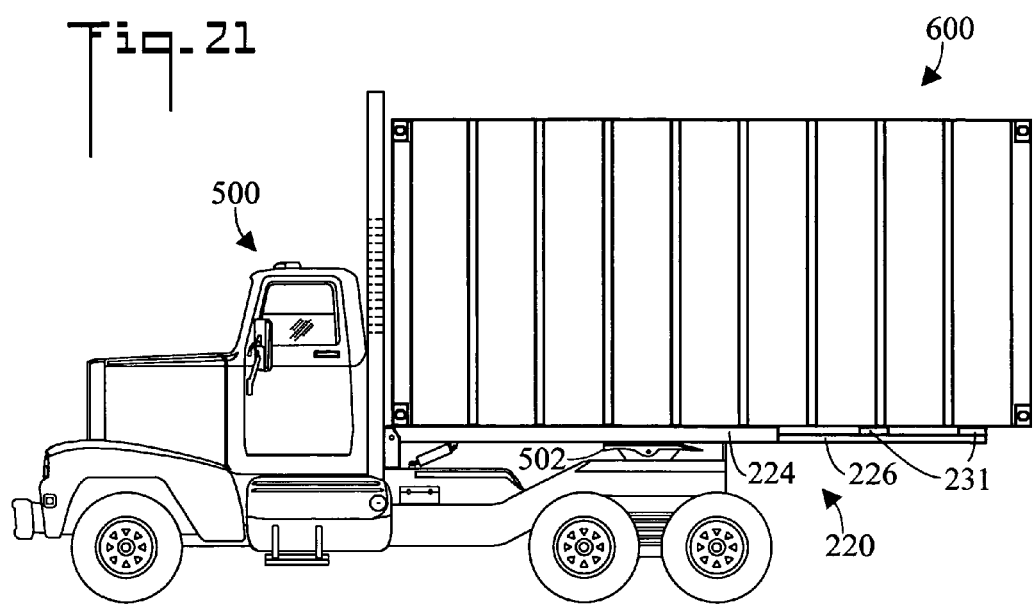
FIG. 21 is a side elevation view of the cargo carry apparatus on a tractor with a 20 foot cargo container installed; and, FIG. 22 is an end elevation view of FIG. 21.

FIG. 21 is a side elevation view of cargo carry apparatus 220 including primary deck 224, extended secondary deck 226, and levelers 231 with a standard 20 foot cargo container 600 installed. The extended secondary deck 226 and the levelers 231 make it possible to levelly carry the standard 20 foot cargo container 600 on tractor 500.

Figure 22:
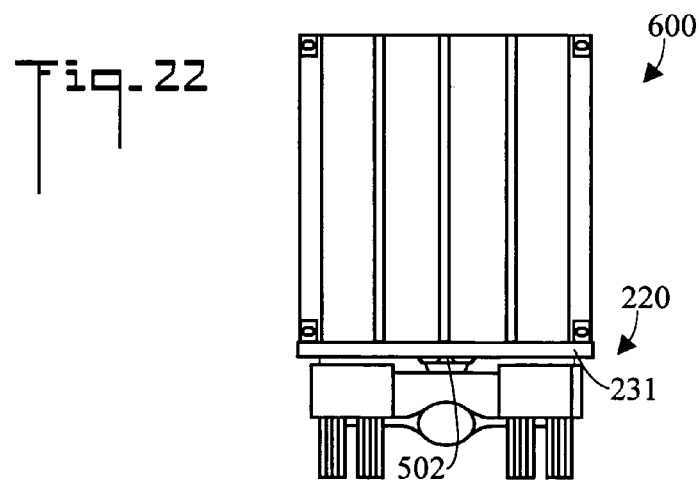

FIG. 22 is an end elevation view of FIG. 21. The cargo container 600 is held on in any conventional manner. A preferred manner is to use locking bolts on the four bottom corners commonly used to secure a container to a semitrailer chassis. Another way is to use wide nylon binding straps which go over the top of the container and are pulled tight by winches on the sides of the decks 224 and 226.

In terms of use, a method for transporting a 20 foot cargo container 600 includes:

providing the 20 foot cargo container 600;

providing a tractor 500 having a fifth wheel 502 and a longitudinal axis 504, the tractor 500 further including cargo carrying apparatus 220 which includes:

(1) a primary deck 224 having an end portion 240 which is rotatably connected to tractor 500;

(2) the primary deck 224 being selectively rotatable from a substantially vertical orientation to a substantially horizontal orientation around a pivot axis 260 which is substantially perpendicular to the longitudinal axis 504 of tractor 500;

(3) the primary deck 224 having a first top portion 225 defining a plane 227;

(4) a longitudinally extendable secondary deck 224 slidably connected to primary deck 224 so that when primary deck 224 is in the horizontal orientation, the secondary deck 226 may be selectively extended from the primary deck 224;

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A method for transporting a 20 foot cargo container, comprising:
 providing said 20 foot cargo container;
 providing a tractor having a fifth wheel and a longitudinal axis, said tractor further having cargo carrying apparatus including;
 (1) a primary deck having an end portion rotatably connected to said tractor;
 (2) said primary deck selectively rotatable from a substantially vertical orientation to a substantially horizontal orientation around a pivot axis which is substantially perpendicular to the longitudinal axis of said tractor;
 (3) said primary deck having a first top portion defining a plane;
 (4) a longitudinally extendable secondary deck slidably connected to said primary deck so that when said primary deck is in said horizontal orientation, said secondary deck may be selectively horizontally extended from said primary deck;
 (5) said secondary deck having a second top portion, said second top portion of said secondary deck disposed below said first top portion of said primary deck;
 (6) a leveler having a third top portion;
 causing said primary deck to rotate to a substantially horizontal orientation above said fifth wheel;
 sliding said secondary deck out horizontally from a retracted position adjacent to said primary deck to an extended horizontal position away from said primary deck;
 connecting said leveler to said second top portion of said secondary deck so that said third top portion of said leveler is substantially coplanar with said plane defined by said first top portion of said primary deck; and,
 disposing said 20 foot container upon said primary deck and said leveler.

2. The method according to claim 1, wherein said leveler includes a lip upwardly projecting from said secondary deck.

3. The method according to claim 1, wherein said leveler includes at least one member which is removably connectable to said top portion of said secondary deck.

* * * * *